United States Patent
Lin et al.

(10) Patent No.: US 8,346,276 B2
(45) Date of Patent: Jan. 1, 2013

(54) DEVICE AND METHOD OF COLLECTING AND DISTRIBUTING REPORTING SERVICE MEASUREMENT DATA IN A WIRELESS COMMUNICATIONS SYSTEM

(75) Inventors: Sheng L. Lin, Lisle, IL (US); Catherine L. Cayer, Naperville, IL (US)

(73) Assignee: Alcatel Lucent, Paris (FR)

( * ) Notice: Subject to any disclaimer, the term of this patent is extended or adjusted under 35 U.S.C. 154(b) by 398 days.

(21) Appl. No.: 12/385,120

(22) Filed: Mar. 31, 2009

(65) Prior Publication Data

US 2010/0246418 A1 Sep. 30, 2010

(51) Int. Cl.
*H04W 72/00* (2009.01)
(52) U.S. Cl. .................................................... 455/453
(58) Field of Classification Search ................... None
See application file for complete search history.

(56) References Cited

U.S. PATENT DOCUMENTS

| 6,405,160 | B1 * | 6/2002 | Djaja et al. ..................... 703/24 |
| 7,120,442 | B2 * | 10/2006 | Kim et al. ..................... 455/450 |
| 7,414,989 | B2 * | 8/2008 | Kuchibhotla et al. ......... 370/329 |
| 7,616,642 | B2 * | 11/2009 | Anke et al. ............... 370/395.42 |

\* cited by examiner

*Primary Examiner* — Lincoln Donovan
*Assistant Examiner* — Sibin Chen
(74) *Attorney, Agent, or Firm* — Harness, Dickey & Pierce, P.L.C.

(57) ABSTRACT

A local radio network controller (RNC) includes one or more stage buffers, with each stage buffer including a database configured to receive and index service measurement data, and a plurality of service measurement data (SM) buffers configured to store the service measurement according to the index of the database, and to send at least one of the stored service measurement data to a next stage of processing at least one of during the receiving of the service measurement data by the stage buffer and before the stage buffer has completed receiving the service measurement data. A depth and number of the SM buffers and a buffer serving time are allocated such that the one or more stage buffers are scalable to support a service node of increasing size by supporting a diverse number of service measurement pegging and appearing virtually infinite in size to applications pegging the service measurement data.

20 Claims, 6 Drawing Sheets

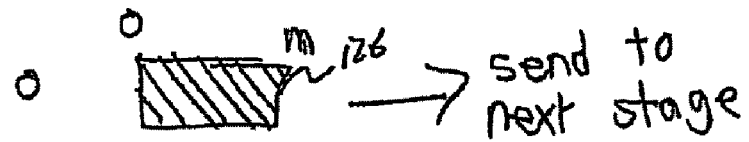
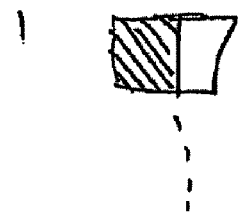
depth exhaustion
number exhaustion

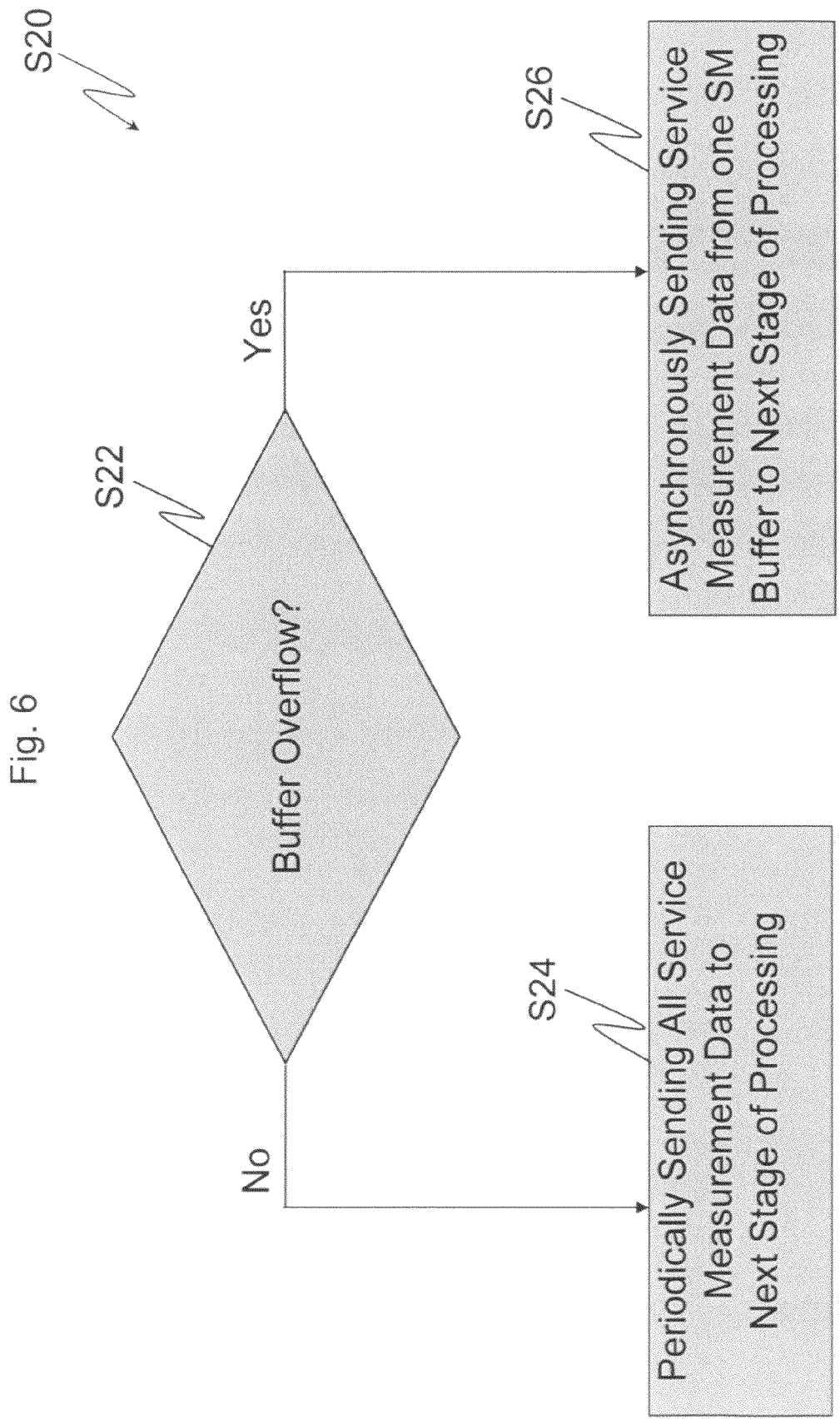

DEVICE AND METHOD OF COLLECTING AND DISTRIBUTING REPORTING SERVICE MEASUREMENT DATA IN A WIRELESS COMMUNICATIONS SYSTEM

BACKGROUND

A multi-carrier wireless communications system includes one or more service nodes. Each service node consists of one or more Radio Network Controllers (RNCs) and may also connect to other service nodes. Each RNC further connects to one or more cells within the service node, where each cell includes a plurality of base stations (BS). Each BS communicates with a plurality of mobiles over multiple carrier frequencies. Optionally, a cell may be divided into sectors so that the same carrier frequency may be used multiples times within the same cell.

Processors inside each of the RNCs collect service measurement data for the mobiles handled by the cells connected to the RNC that includes the respective processor. In addition, the processors inside each of the RNCs collect service measurement data for those mobiles which migrate away from the cells of the RNC including the respective processor to a cell handled by another RNC. Thus, the processors inside each of the RNCs may collect, store, and forward service measurement data for other RNCs of the same service node. In addition, each of the RNCs needs to consolidate service measure data collected by RNCs in others nodes as well as the RNCs in its own node, for reporting.

If one of the mobiles crosses a boundary of one of the service nodes, a mobile transfer occurs where the mobile is handled by another of the service nodes. If a mobile travels along a service node boundary, this transfer may occur at a relatively high frequency and consume an inordinate amount of system resources. This transfer does not generate any revenue for a service provider. The current trend is to increase a size of the service node, thus pushing service node boundaries to regions of less transient mobile traffic. However, increasing the size of the service node also increases a size of the community of RNCs that collect service measurement data for each other. Thus, each of the RNCs must collect an increasing amount of service measurement data as the size of the service node increases.

For example, the number of carriers each of the RNCs in a node must support may increase as node size increases as shown in Table 1 below.

TABLE 1

| Node Size | Carriers per RNC | 3 Sector-Carriers per RNC | 6 Sector-Carriers per RNC |
|---|---|---|---|
| x | 544 | 1,632 | 3,264 |
| x + y | 1,600 | 4,800 | 9,600 |
| x + y + z | 4,000 | 12,000 | 24,000 |

The variables x, y and z represent natural numbers where $x<(x+y)<(x+y+z)$. The total number of carriers for each of the RNCs includes carriers from other RNCs within the service node that have to be supported. Thus, in a conventional architecture, the number of carriers each of the RNCs supports rapidly grows as the service node size increases. Also, each carrier can have, for example, 3 or 6 sectors, which further increases the number of service measurement data each of the RNCs must support. For example, the last two columns in Table 1 above represent the number of sector-carrier service measurement data each of the RNCs must support for a 3-sector carrier and a 6-sector carrier, respectively.

In addition, customers are progressively requiring a greater number of service measurement data inside each data set per carrier. Table 2 below shows one example of such growth over the years.

TABLE 2

| Year | Number of Service Measurement data per carrier of RNC |
|---|---|
| 2006 | 95 |
| 2008 | 297 |
| 2009 | 349 |

Service providers may use service measurement data to evaluate performance and optimize parameter settings of both the RNC and the BS. The RNC may directly collect service measurement data from the cells to which the RNC is connected and receive service measurement data for other cells through other RNCs.

Each of the service measurement data may, for example, be 4 bytes in size. Thus, the minimum memory needed for collecting all the service measurement data of table 2 in the 6 sector-carrier RNC of table 1 as node size increases, may be as shown below in Table 3.

TABLE 3

| Node Size | Year | Minimum memory for collecting service measurement data in megabytes (MB) for each processor in 6 sector-carrier RNC |
|---|---|---|
| x | 2006 | 1.3 |
| x + y | 2008 | 11.3 |
| x + y + z | 2009 | 33.5 |

The above minimum memory is calculated by multiplying 4 bytes by the number of carriers for a 6 sector-carrier RNC for a given node size and the number of service measurement data per carrier for a given year. For example, for the 6 sector-carrier RNC in the node size x+y+z and the year 2009, the calculation would be 4 bytes*24,000*349≈33.5 MB. In implementation, the needed memory is generally doubled to avoid race conditions during service measurement reporting. Moreover, if the number of service measurement data exceeds a capacity of the RNC, the service measurement data is discarded by the RNC and therefore lost in the conventional architecture. In addition, simply increasing the memory size may be expensive and impractical. Nonetheless, even if the memory size is increased, there may be no assurance that the memory size will be large enough to store all the service measurement data for a given period of time, and therefore, some of the service measurement data may still be lost.

The increase in memory needed at each RNC is just one problem associated with an increase in node size in a conventional architecture. For example, during service measurement data reporting, the data collected for a mobile at a node other than the mobile's original node needs to be consolidated. However, the above-mentioned carrier and service measurement data growths further compound this difficulty. In the conventional architecture, each of the RNCs may be allocated a 7 minute window to collect, forward, and consolidate all service measurement data. However, with the increase in carrier and service measurement data sizes due to the node size increase, the RNCs will not be able complete the reporting within the 7 minute window.

The conventional service measurement data collection described above is conducted at hourly intervals. However, customers have recently been requesting service measurement reports at shorter intervals, such as 15 minutes and 5 minutes. As the conventional architecture requires a 7 minute window to consolidate reports, a shorter collection interval, such as 5 minutes, can not be supported by the conventional architecture.

Both the growth of carrier and service measurement data size will continue. Yet in the conventional architecture, the growth of a service node will become limited by the memory size, processor usage, and a sending time of the RNCs in the service node. Thus, the conventional architecture is not sustainable for future growth and/or may require significant maintenance and upgrade costs.

SUMMARY

Example embodiments relate to device and method of collecting and distributing service measurement data in a wireless communications system.

According to an example embodiment, a local radio network controller (RNC) includes one or more stage buffers, with each stage buffer including a database configured to receive and index service measurement data, and a plurality of service measurement data (SM) buffers configured to store the service measurement according to the index of the database, and to send at least one of the stored service measurement data to a next stage of processing at least one of during the receiving of the service measurement data by the stage buffer and before the stage buffer has completed receiving the service measurement data.

In one embodiment, the database receives the service measurement data including carrier measurements collected from at least one cell site in a service node, with the carrier measurements including at least one service count, where the at least one service count indicates a number of occurrences of a condition.

In an example embodiment, the database indexes the at least one service count according to a key based on associated values of at least one of an IP address, cell number, sector number, bandclass, and channel number.

In an example embodiment, the database is further configured to implement a hash table to provide the index to at least one of the plurality of SM buffers in response to the keyed value included in the service measurement data.

In one embodiment, at least one count buffer of the one or more stage buffers is configured to assign the at least one service count to one of the plurality of SM buffers of the at least one count buffer according to the keyed value, at least one send buffer of the one or more stage buffers is configured to assign the service measurement data received from the at least one count buffer to one of the plurality of SM buffers of the at least one send buffer according to a destination of the service measurement data, at least one consolidate buffer of the one or more stage buffers is configured to receive and forward the service measurement data from the at least one send buffer to one or more of the destinations of the service measurement data according to a rate that homogenizes network traffic flow.

In an example embodiment, the count buffer and send buffer are each included in one of an application processor (AP) and a traffic processor (TP) of the RNC.

In an example embodiment, at least one of a depth and number of the plurality of SM buffers is allocated based on a buffer serving time of the service measurement data such that at least one of a depth and number of the plurality of SM buffers is insufficient to prevent buffer overflow, with buffer overflow occurring when one the depth and the number of SM buffers is exhausted and with the buffer serving time including a time interval during which the plurality of SM buffers store the service measurement data and do not send the service measurement data.

According to an example embodiment, the depth and number of SM buffers and the buffer serving time are allocated such that the one or more stage buffers are scalable to support a service node of increasing size by supporting a diverse number of service measurement pegging and appearing to be virtually infinite in size to applications that are pegging the service measurement data.

In an example embodiment, at least one of a depth and number of the plurality of SM buffers is allocated based on a buffer serving time of the service measurement data by the plurality of SM buffers such that a majority of the plurality of SM buffers are utilized while allowing for buffer overflow to occur, with buffer overflow occurring when one the depth and the number of SM buffers is exhausted and with the buffer serving time including a time interval during which the plurality of SM buffers store the service measurement data and do not send the service measurement data.

In an example embodiment, at least one of the plurality of SM buffers forwards the stored service measurement data of the at least one of the plurality of SM buffers to the next stage of processing when one of the depth of the at least one of the plurality of SM buffers is exhausted and the number of the plurality SM buffers is exhausted.

In an example embodiment, the plurality SM buffers forward service measurement data to the next stage of processing at an end of the buffer serving time.

In an example embodiment, the stage buffer determines the buffer serving time based on a serving time needed to share a cost of distribution between the SM buffers, with the needed serving time based on at least one of a usage profile and a number of available SM buffers.

According to an example embodiment, in a method of collecting and distributing service measurement data using a local radio network controller (RNC) including one or more stage buffers, the method for each stage buffer comprising includes receiving and indexing service measurement data, storing the service measurement data according to the indexing, and sending at least one of the stored service measurement data to a next stage of processing at least one of during the receiving of the service measurement data by the stage buffer and before the stage buffer has completed receiving the service measurement data.

In an example embodiment, the receiving receives the service measurement data including carrier measurements collected from at least one cell site in a service node, with the carrier measurements including at least one service count, where the at least one service count indicates a number of occurrences of a condition.

In an example embodiment, the receiving indexes the at least one service count according to a key based on associated values of at least one of an IP address, cell number, sector number, bandclass, and channel number.

In an example embodiment, the receiving is further configured to implement a hash table to provide the index to at least one of the plurality of SM buffers in response to the key included in the service measurement data.

In an example embodiment, the storing includes storing the service measurement data in a plurality of SM buffers, with at least one of a depth and number of the plurality of SM buffers allocated such that a majority of the plurality of SM buffers are being utilized while allowing for buffer overflow to occur, with buffer overflow occurring when one of the depth and the number of SM buffers is exhausted.

In an example embodiment, the storing includes storing the service measurement data in a plurality of SM buffers, with at least one of a depth and number of the plurality of SM buffers allocated based on a buffer serving time of the service measurement data by the plurality of SM buffers such that at least one of a depth and number of the plurality of SM buffers is insufficient to prevent buffer overflow, with buffer overflow occurring when one the depth and the number of SM buffers is exhausted and with the buffer serving time including a time interval during which the plurality of SM buffers store the service measurement data and do not send the service measurement data.

According to an example embodiment, the storing allocates the depth and number of SM buffers and the buffer serving time such that the one or more stage buffers are scalable to support a service node of increasing size by supporting a diverse number of service measurement pegging and appearing to be virtually infinite in size to applications that are pegging the service measurement data.

In an example embodiment, the sending forwards the stored service measurement data of at least one of the plurality of SM buffers to the next stage of processing when at least one of the depth of the at least one of the plurality of SM buffers is exhausted and the number of the plurality SM buffers is exhausted.

In an example embodiment, the sending forwards the service measurement data of the plurality SM buffers to the next stage of processing at an end of the buffer serving time.

In an example embodiment, the sending determines the buffer serving time based on a serving time needed to share a cost of distribution between the SM buffers, with the needed serving time based on at least one of a usage profile and a number of available SM buffers.

BRIEF DESCRIPTION

Example embodiments will become more fully understood from the detailed description given herein below and the accompanying drawings, wherein like elements are represented by like reference numerals, which are given by way of illustration only and thus are not limiting of the present invention, and wherein:

FIG. 4A illustrates an example of depth exhaustion of a SM buffer in FIG. 2;

FIG. 4B illustrates an example of width exhaustion of a plurality of SM buffers in FIG. 2;

FIG. 6 illustrates an embodiment of step S20 in the method in FIG. 5.

DETAILED DESCRIPTION

Figure 1:
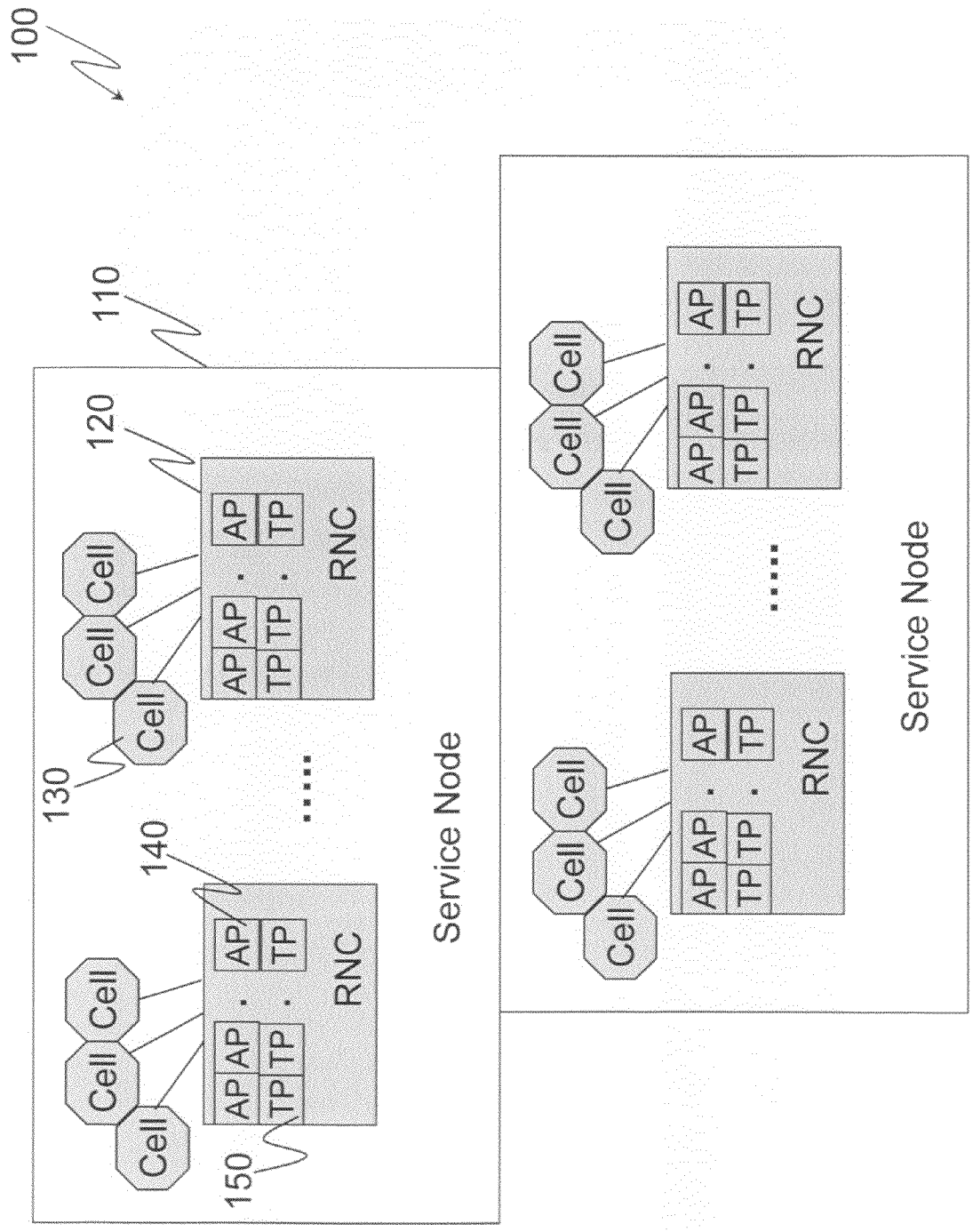
FIG. 1 illustrates a portion of a wireless telecommunications system according to an example embodiment.

Various example embodiments will now be described more fully with reference to the accompanying drawings.

Specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent", etc.).

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Specific details are given in the following description to provide a thorough understanding of example embodiments. However, it will be understood by one of ordinary skill in the art that example embodiments may be practiced without these specific details. For example, systems may be shown in block diagrams in order not to obscure example embodiments in unnecessary detail. In other instances, well-known processes, structures and techniques may be shown without unnecessary detail in order to avoid obscuring example embodiments.

Also, it is noted that example embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but could have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "mobile" may be considered synonymous to, and may hereafter be occasionally referred to, as a mobile unit, mobile station, mobile user, user equipment (UE), subscriber, user, remote station, access terminal, receiver, etc., and may describe a remote user of wireless resources in a wireless communication network. The term "base station" may be considered synonymous to and/or referred to as a base transceiver station (BTS), base station (BS), Node B, etc. and may describe equipment that provides data and/or voice connectivity between a network and one or more users.

As is well-known in the art, each of a mobile and a base station may have transmission and reception capabilities. Transmission from the base station to the mobile is referred to as downlink or forward link communication. Transmission from the mobile to the base station is referred to as uplink or reverse link communication.

FIG. 1 illustrates a portion of a wireless telecommunications system according to an example embodiment. As shown, the wireless telecommunications system 100 includes at least one service node 110. Each service node 110 includes a plurality of Radio Network Controllers (RNC) 120 and cells 130. Each RNC 120 connects to one or more cells 130 through one or more base stations (BS) (not shown). Inside each of the RNCs 120, there are a plurality of processors for collecting service measurement data, such as one or more Application Processors (AP) 140 and Traffic Processors (TP) 150. For example, the RNC 120 may include up to 8 APs 140 and up to 16 TPs 150. However, example embodiments may include more or less TPs 150 and APs 140. The service node 110 may represent a wide service area belonging to a particular service provider. When a mobile (not shown) crosses the boundary of the service node, a mobile transfer may occur where the mobile is transferred to another service node. Mobile transfers may incur processor usage costs to both service nodes, but do not generate revenue for the service providers. Therefore, the service provider may desire expanding and merging service nodes to reduce the number of mobile transfers. However, this will also increase a group community size of RNCs 120 that collect service measurement data for each other. Thus, the AP 140 and TP 150 of each of the RNCs 120 must collect an increasing amount of service measurement data as the size of the service node increases.

Each cell 130 corresponds to a geographic area having a given radius and may include one or more BSs communicating with one or more of the mobiles. Further, each cell 130 may be divided into sectors (not shown). A plurality of mobiles may be located in the cell at any one time. Each of the mobiles may transmit data to and receive data from the one or more BSs in each of the cells 130.

The RNC 120 may be communicatively coupled to the one or more BSs by any of a variety of wired and/or wireless links. Signals passed between the RNC 120 and the one or more BSs may pass through one or more other devices (not shown), such as, routers, switches, networks or the like. The RNC 120 may also serve as an interface between the mobile, and other wireless telecommunications systems, GPRS Service Nodes (SGSNs), Gateways (GGSNs), or any other wireless or terrestrial network or network device. Further, the RNC 120 may perform other tasks such as switching and/or provisioning services of a mobile switching center (not shown) and/or 3G data network interfaces, such as, in an Evolution-Data Optimized (EV-DO) network. The processors AP 140 and TP 150 inside the RNC 120 may collect service measurement data from a BS associated with the RNC thereof or receive service measurement data from another RNC 120. Collecting service measurement data from the BS may also be referred to as pegging. Each of the RNCs 120 may also store the service measurement data or forward the service measurement data to an other RNC 120. The pegging, receiving, forwarding, and storing of data may be carried out singly or in any combination thereof by the RNC 120.

Although the total allocated memory for each of the RNCs 120 in the current architecture to support all possible service measurements may be relatively large, such as 33.5 MB, the actual usage of this allocated memory by the processors AP 140 and TP 150 may be relatively low. For example, the percentage of the total allocated memory used by each of the processors AP 140 and TP 150 may be less than 10% in a one hour window. If this window is reduced from one hour to one minute, the actual usage by each of the processors AP 140 and TP 150 may be less than 1%. Thus, example embodiments may use store and forward techniques that strike a balance between buffer size and a periodicity of forwarding collected service measurement data. Periodic forwarding of the service measurement data may amortize the forwarding cost and also reduce the overflowing of available buffers. Nevertheless, some buffer overflow may still occur. A balance between the buffer size and the periodicity of forwarding data may be determined empirically or based on specifications such that buffer overflow is reduced or minimized. Should buffer overflow occur, example embodiments may forward data overflow buffer to a next stage of processing. The next stage of processing will be explained in more detail with respect to FIGS. 2-3 while buffer overflow will be explained in more detail below with respect to FIGS. 4A-4B and 6.

Figure 2:
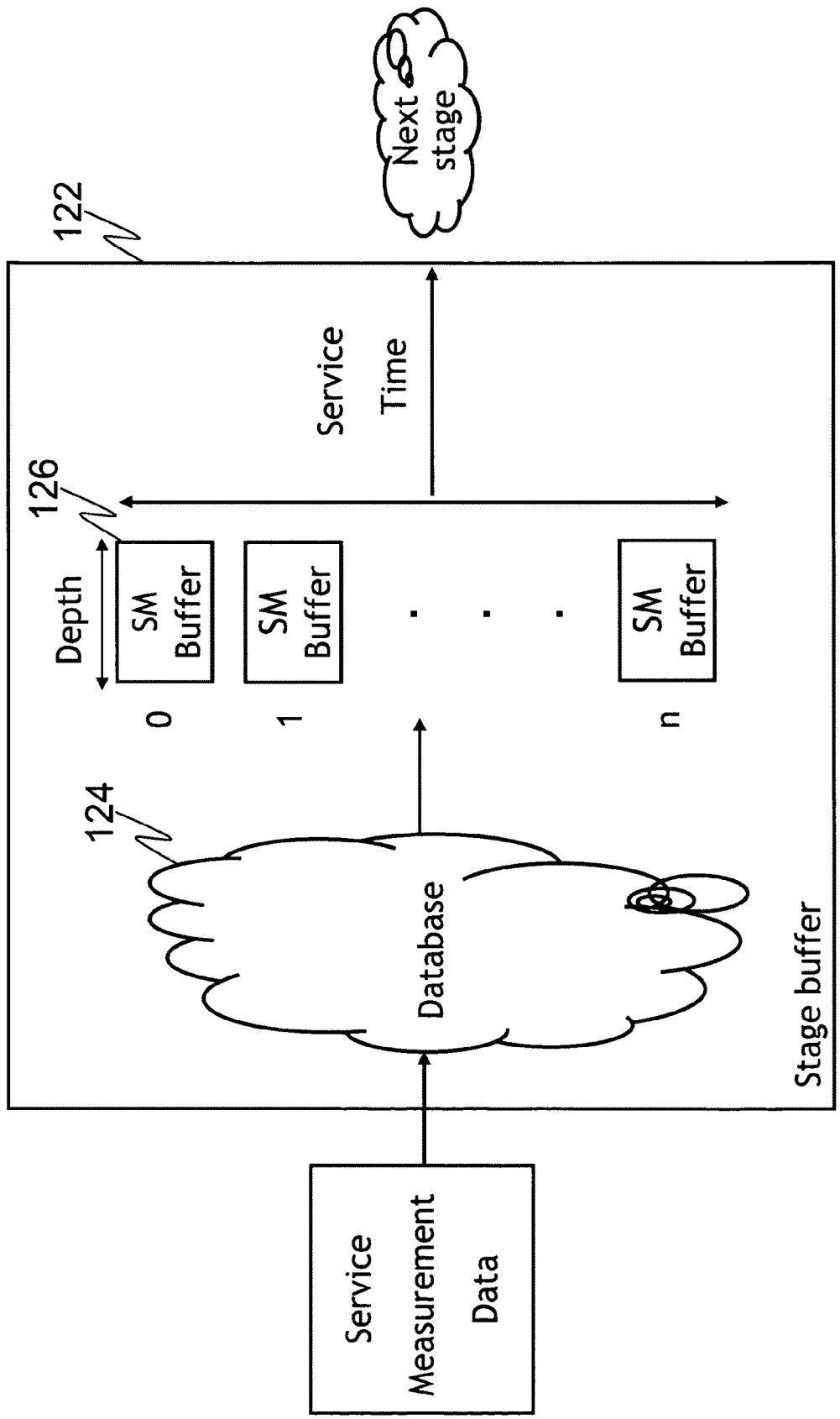
FIG. 2 illustrates an embodiment of a stage buffer inside a processor of a RNC of FIG. 1.

FIG. 2 illustrates an embodiment of a stage buffer 122 inside the RNC 120 of FIG. 1. For example, the stage buffer 122 may be included in each of the processors AP 140 and TP 150 of the RNC 120. The stage buffer 122 includes a database 124 and a plurality of service measurement (SM) buffers 126 0 to n, where n is an integer.

The database 124 is configured to associate a random key set of diverse values for a service measurement data set to a newly, or a previously, assigned SM buffer 0 to n.

The service measurement data includes carrier measurements collected from at least one cell site in the service node, with the carrier measurements including at least one service count, where the at least one service count indicates a number of occurrences of a condition. To allocate memory for the service counts, a set of measurement data may generally be distinguished by a set of keys. For example, a service count, such as a sector-carrier count, may be keyed by values of at least one an of IP address, cell number, sector number, bandclass, and channel number. Given a set of keys, each service count uses a specific assigned SM buffer 126.

Inside a specific set of service measurement data, the service counts are distinguished by their name and value. After allocating one of the SM buffers 126 0-n for the specific set of service measurement data, service counts thereof are stored as a succession of name-value pairs. Thus, memory is only allocated for service counts that are collected, and not for counts that have not been pegged.

The database 124 may be further configured to implement a hash table (not shown) to provide an index to at least one of the plurality of SM buffers 126 in response to a key included in the service measurement data. The hash table may provide a fast and dynamic way to assign or find a SM buffer 126. A hash table size is the number of entries in the hash table and may be over allocated as part of a hashing algorithm to reduce hash collisions. The size of an entry in the hash table may small, e.g. a short index to the plurality of SM buffers 126. The key or at least part of the key may also be stored along with the service measurement data in the plurality of SM buffers 126.

The plurality of SM buffers 126 are configured to store the service measurement data received from the database 124 and to send at least one of the stored service measurement data to a next stage of processing during the receiving of the service measurement data by the stage buffer 122. Also, at least one of the plurality of SM buffers 126 may send the stored measurement data before the stage buffer 122 has completed receiving the service measurement data.

The stage buffer 122 may also include a processing unit (not shown) to carry out general operations such as, for example, receiving service measurement data, allocating an SM buffer 126, forwarding SM buffer data, and handling SM buffer overflow as described in FIGS. 4A-4B. Alternatively, the SM buffer 126 and/or the database 124 may carry out the above operations instead of the processing unit.

In an embodiment, the database 124 is configured to receive the service measurement data and to index the service measurement data to the plurality of SM buffers 126. The plurality of SM buffers 126 are configured to store the remote service measurement data and subsequently forward the data to a next stage of processing, as described in further detail in FIG. 3.

Figure 3:
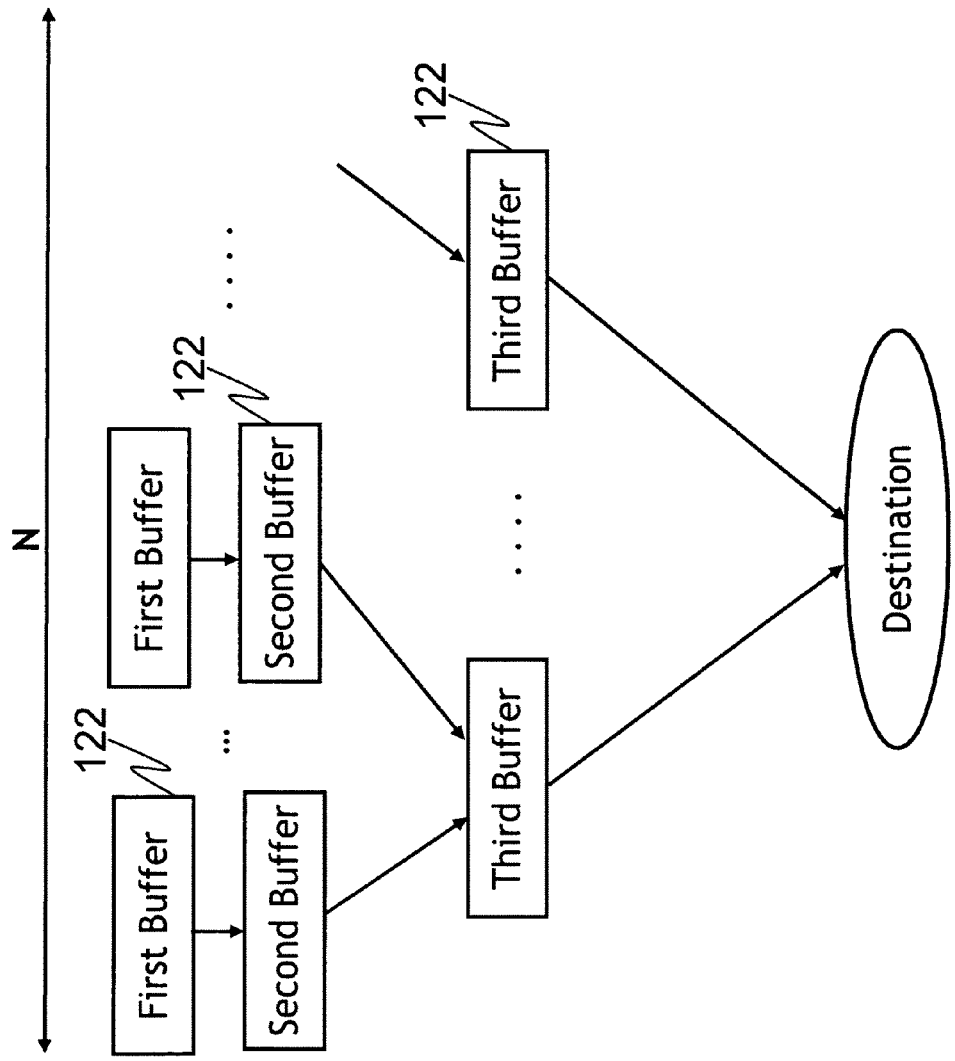
FIG. 3 illustrates an embodiment of the stage buffer of FIG. 2 in a network.

FIG. 3 illustrates an embodiment of the stage buffer 122 of FIG. 2 in a network. The stage buffer 122 of FIG. 2 may be embodied as any one of the shown first, second and third buffers. For example, the second buffers 122 may represent a current stage of processing that receives service measurement data from the first buffers 122 and forwards the service measurement data to a next stage of processing, which may represent the third buffers 122. The first buffers 122 may represent a first stage of processing, the second buffers 122 may represent a second stage of processing, and so on. The destination may represent a final stage of processing.

One or more of the stage buffers 122 may be included in each of the processors AP 140 and TP 150 and/or other stages of buffering within the RNC 120. For example, the RNC 120 of FIG. 1 may include at least three types of stage buffers 122, with each type of stage buffer 122 having a different function, as explained below.

Referring to FIGS. 2 and 3, the first buffers 122 may be called count buffers and may be included in at least one of the AP 140 and TP 150 of the RNC 120. The number "N" in the first stage of processing may represent the number of AP 140 and/or TP 150 processors in the RNC 120. In addition to the buffer management described above with respect to FIG. 2, the count buffer may consolidate service counts in real time by assigning the at least one service count to one of the plurality of SM buffers 126 of the count buffer according to the keyed value. For example, if a specific service count of a service measurement data set is pegged repeatedly, the count buffer will operate to find the assigned SM buffer 126 for that service measurement data set and add a service count value to the corresponding name-value pair for the specific service count, where the name-value pair is determined according to the keyed value. Such operations may assure optimal usages of the assigned SM buffers such that SM buffers 126 are not allocated unnecessarily.

The second buffers 122 may be called send buffers and may be also be included in at least one of the AP 140 and TP 150 of the RNC 120. The send buffers are allocated according to a destination RNC of the service measurement data by assigning the service measurement data received from the at least one count buffer to one of the plurality of SM buffers 126 of the send buffer according to a destination of the service measurement data. For example, the content of each of the SM buffers 126 inside the send buffers may simply be concatenations of service measurement data received from the plurality count buffers in the previous stage of processing that are being sent to a same destination. Each destination may represent an RNC 120 either in the same node 110 or another node 110.

The third buffers 122 may be called consolidate buffers. Each of the RNCs 120 may include the consolidate buffer. The consolidate buffer may included in one of the AP 140 and TP 150 or be external to both the AP 140 and TP 150. The consolidate buffers collect data from at least one of the AP 140 and TP 150 of the same RNC 120, and forward the data to one or more respective destinations at an engineered rate to smooth out or homogenize network traffic flow such that network congestion is lessened and processor usage, such as that of the AP 140 and TP 150, is more uniform.

A buffer serving time represents a periodicity of clearing the content of at least one of the stage buffer 122 and/or SM buffers 126 to the next stage of processing. For example, the buffer serving time may include a time interval during which the plurality of SM buffers 126 store the service measurement data and do not send the service measurement data. Taking into account a number of the stage buffer 122 and/or SM buffers 126 for a specific stage of processing, this periodicity is empirically determined to reduce, but not necessarily eliminate, buffer overflow as explained with respect to FIGS. 4A-4B. Further, as all the stage buffers 122 allocate SM buffers 126 based on actual memory usage and not on potential memory needs, memory is allocated optimally.

FIG. 4A illustrates an example of depth exhaustion of a SM buffer 126 of FIG. 2. FIG. 4B illustrates an example of width exhaustion of a plurality of SM buffers 126 of FIG. 2.

Buffer overflow may occur when one of buffer depth and width is exhausted. Referring back to FIG. 2, a number of SM buffers 126 may be referred to as buffer width. A storage capacity of each SM buffer 126 may be referred to as buffer depth. Service measurement data collections are statistical events. Buffer width may be allocated according to a type of data to be stored. For example, in count buffers, different sets of service measurement data are stored. In send buffers, data for distinct RNC destinations are stored.

Referring to FIG. 4A, an "n+1" number of SM buffers 126 with a depth "M" are illustrated, where "n" and "M" are integers. Each SM buffer 126 may hold a varying amount of service measurement data. For instance, the SM buffer 126 at index "0" has been filled to a depth "M" and is thus full. The SM buffers 126 at indices "1" and "n" are partially full, and the SM buffer 126 at index "n−1" is empty. The stored service measurement data of the SM buffer 126 at index "0" is sent to the next stage of processing because the depth of a count buffer 126 is exhausted or full. After the service measurement data is sent, the SM buffer 126 at index "0" may be immediately reused. As illustrated in FIG. 4A, the remaining plurality of SM buffers 126 may still store additional measurement data so they do not send the measurement data to the next stage of processing due to a buffer overflow.

Referring to FIG. 4B, an "n+1" number of SM buffers 126 with a depth "M" are illustrated in manner similar to that described at FIG. 4A. The stored service measurement data of the SM buffer 126 at index "n−1" is sent to the next stage of processing when the number of SM buffers 126 is exhausted. After the service measurement data is sent, the SM buffer 126 at index "n−1" may be immediately reused for storing a new set of service measurement data. The SM buffer 126 at index "n−1" is only used as an example, and example embodiments may send the contents of any SM buffer 126 to the next stage of processing. For example, in one embodiment, the SM buffer 126 may be selected according to an algorithm that reduces thrashing. Thrashing may occur, for instance, if a service measurement data is sought to be stored to a SM buffer 126 that is simultaneously sending the service measurement data to the next stage of processing. In example embodiments, the algorithm may select the SM buffer 126 that is least active. In another embodiment, the algorithm may simply be a round robin selection.

The number of SM buffers 126 may be exhausted independently and regardless of whether the depth of the SM buffers 126 is exhausted. Also, at the end of buffer serving time, the service measurement data stored within at least one of the plurality of SM buffers 126 may be sent to the next stage of processing regardless of whether the depth or number of the SM buffers 126 has been exhausted.

At least one of a depth and number of the plurality of SM buffers 126 may be allocated based on a buffer serving time of the service measurement data such that at least one of a depth and number of the plurality of SM buffers 126 is insufficient to prevent buffer overflow and/or such that a majority of the plurality of SM buffers 126 are utilized while allowing for buffer overflow to occur. Design parameters for the depth and number of SM numbers 126 may be empirically determined according to a particular application.

As the buffer serving time increases, the plurality of SM buffers 126 become increasingly filled with the service measurement data. At least one of shortening the buffer serving time and allowing for buffer overflow may result in a more even distribution of processor use within the RNC 120, as tasks may be then be less processor intensive and occur with a higher frequency. For example, the buffer serving time may be allocated based on a needed serving time to share the cost of distribution between the SM buffers 126, with the needed serving time being based on at least one of a support usage profile and a number of available SM buffers 126. The usage profile may represent control parameters empirically determined according to a particular application.

Figure 5:
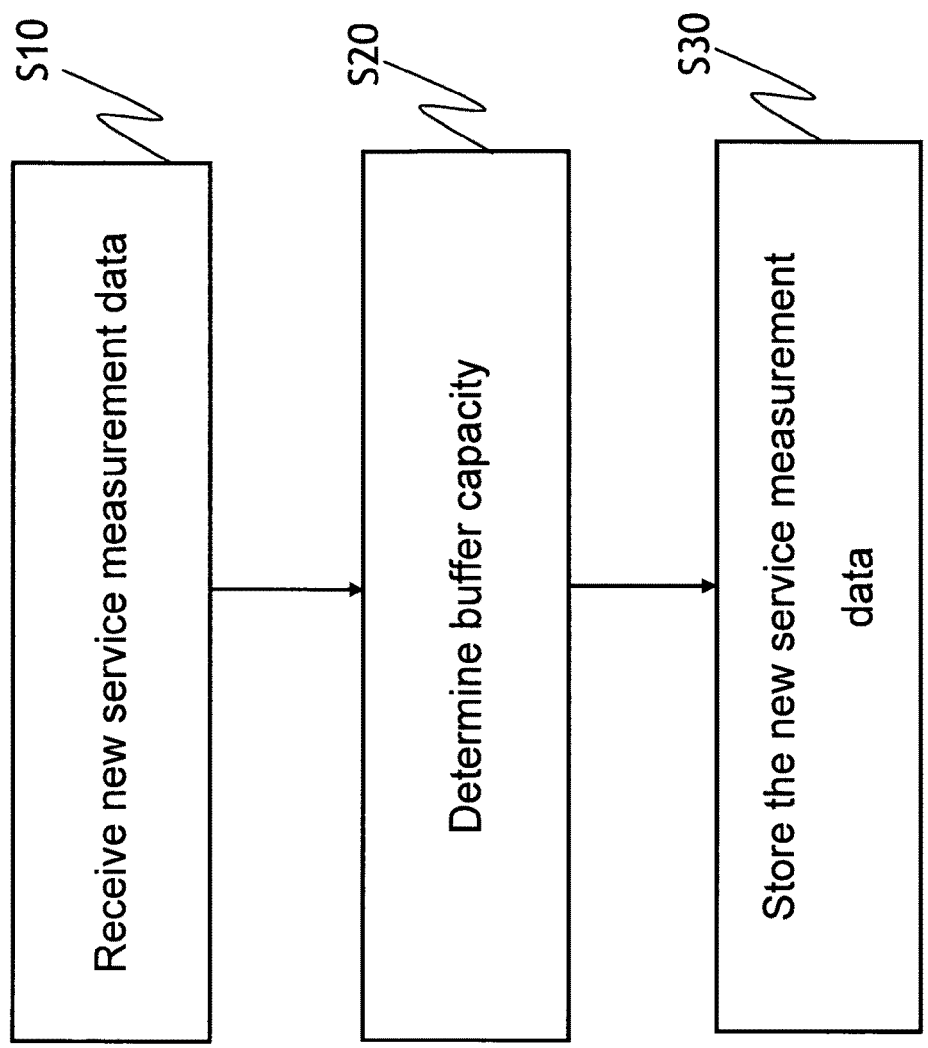
FIG. 5 illustrates a method of collecting and distributing service measurement data according to an example embodiment.

FIG. 5 illustrates a method of collecting and distributing service measurement data according to an example embodiment. The method of FIG. 5 will be described in relation to, but not limited to, the stage buffer 122 of FIG. 2. Furthermore, while FIG. 5 describes the method with respect to a single stage buffer 122, it will be appreciated that the method may be performed for a plurality of buffers and/or a plurality of RNCs 120. Further, the method may be performed in parallel for the plurality of buffers and/or RNCs 120.

Referring to FIGS. 2 and 5, in step S10, new service measurement data is received by the database 124. The service measurement data may, for example, be received from another stage buffer 122 from the previous stage of processing. Next, at step S20, buffer capacity is determined of the SM buffers 126, as further shown in FIG. 6. Lastly, at step S30, the database 124 indexes and stores the new service measurement data to at least one of the plurality of SM buffers 126.

FIG. 6 illustrates an embodiment of step S20 in the method in FIG. 5, in which the buffer capacity is determined of the SM buffers 126. At step S22, whether at least one of depth or width buffer overflow will occur at the SM buffers 126 from storing the new service measurement data of step S10 is determined.

If no buffer overflow will occur from storing the new service measurement data, at step S24, the service measurement data will not be asynchronously forwarded beforehand. Instead, the service measurement data at all the SM buffers 126 of the stage buffer 122 will be forwarded synchronously at the end of the buffer serving time to the next stage of processing. If buffer overflow will occur from storing the new service measurement data, at step S26, at least one of the SM buffers 126 asynchronously forwards the service measurement data to the next stage of processing according to the methodology described in FIGS. 3-4B. The forwarding of service measurement data at steps S24 and S26 may occur during the receiving of the new service measurement data of step S10. The next stage of processing may include sending the stored service measurement data to another stage buffer 122 and/or remote RNC 120 at a same service node as or a different service node than that of a local RNC 120, where the local RNC 120 is a current RNC 120 from which the stored service measurement data is being sent.

Thus, asynchronous forwarding of service measurement data is not eliminated but instead reduced. By allowing for asynchronous buffer overflows, SM buffers 126 may be designed to not be overly large in order to prevent overflow yet large enough to prevent a high number of buffer overflows from occurring such that the network is unduly burdened.

Hence, proper handling of buffer overflows at each stage may move collected service measurement data toward its final destination without loss of data or significant network costs. Proper tunings of at least one of the buffer sizes (width and depth) and uploading periodicity may reduce the burden on the network of occasional buffer overflows. As such, for applications pegging service measurement counts, buffer size, such as that of the stage buffer 122, may appear to be generally infinite to user applications.

The service measurement data is continuously consolidated towards the destination. For example, a destination RNC will be continuously receiving forwarded data and consolidated service measurement data from the remote RNCs. Except for service measurement data still flowing into the destination RNC from throughout the network, the destination RNC may have the most recent service measurement data from the remote RNCs. This may reduce a time interval of data consolidating and reporting to support a shorter service measurement window, e.g. 5 minutes. Thus, example embodiments may allow for the merging or size increase of service nodes in a wireless network.

Example embodiments provide capabilities for supporting service measurement data in a growing network where buffer sizes and serving times may be empirically determined to maintain optimal network performance. In addition, example embodiments may allow the network size to grow almost indefinitely while maintaining satisfactory performance for collecting service measurement data.

Although example embodiments are described as being carried out by the RNC 120 and/or stage buffer 122, example embodiments are not limited thereto, and may be carried out by various other network elements, either singly or in combination.

Similarly, while example embodiments are described in relation to a wireless communication system, example embodiments are not limited thereto, and may be used in relation to various types of data networks.

According to example embodiments, the described method and device for collecting, distributing, and reporting service measurement data may result in allowing a network architecture to support more carriers without requiring a substantial increase in memory, processor usage, and time to collect or measure service counts.

While example embodiments have been described with respect to a single wireless system and a single RNC, it will be understood that the methods and devices described may be expanded to include multiple network systems and multiple RNCs. Applicable network systems may include various 3G networks such as EV-DO and HSPA. All of the above described functions above may be readily carried out by special or general purpose digital information processing devices acting under appropriate instructions embodied, e.g., in software, firmware, or hardware programming.

Example embodiments being thus described, it will be obvious that the same may be varied in many ways. Such variations are not to be regarded as a departure from the invention, and all such modifications are intended to be included within the scope of the invention.

We claim:

1. A local radio network controller (RNC) including at least one stage buffer, the at least one stage buffer comprising:
    a database configured to receive and index service measurement data; and
    a plurality of service measurement data (SM) buffers configured to store the service measurement according to the index of the database, and to send at least one of the stored service measurement data to a next stage of processing at least one of
        during the receiving of the service measurement data by the at least one stage buffer and
        before the at least one stage buffer has completed receiving the service measurement data; and wherein
    the database is configured to receives the service measurement data including carrier measurements collected from at least one cell site in a service node, with the carrier measurements including at least one service count, where the at least one service count indicates a number of occurrences of a condition.

2. The local RNC of claim 1, wherein the database is configured to index the at least one service count according to a key based on associated values of at least one of an IP address, cell number, sector number, bandclass, and channel number.

3. The local RNC of claim 2, wherein the database is further configured to implement a hash table to provide the index to at least one of the plurality of SM buffers in response to the keyed value included in the service measurement data.

4. The local RNC of claim 2, further comprising:
    at least one count buffer of the at least one stage buffer configured to assign the at least one service count to one of the plurality of SM buffers of the at least one count buffer according to the keyed value;
    at least one send buffer of the at least one stage buffer configured to assign the service measurement data received from the at least one count buffer to one of the plurality of SM buffers of the at least one send buffer according to a destination of the service measurement data;
    at least one consolidate buffer of the at least one stage buffer configured to receive and forward the service measurement data from the at least one send buffer to one or more of the destinations of the service measurement data according to a rate that homogenizes network traffic flow.

5. The local RNC of claim 4, wherein the count buffer and the send buffer are each included in one of an application processor (AP) and a traffic processor (TP) of the RNC.

6. A local radio network controller (RNC) including at least one stage buffer, the at least one stage buffer comprising:
    a database configured to receive and index service measurement data; and
    a plurality of service measurement data (SM) buffers configured to store the service measurement according to the index of the database, and to send at least one of the stored service measurement data to a next stage of processing at least one of
        during the receiving of the service measurement data by the at least one stage buffer and
        before the at least one stage buffer has completed receiving the service measurement data; and wherein
    at least one of a depth and number of the plurality of SM buffers is allocated based on a buffer serving time of the service measurement data such that at least one of the depth and number of the plurality of SM buffers is insufficient to prevent buffer overflow, with buffer overflow occurring when one the depth and number of the plurality of SM buffers is exhausted and with the buffer serving time including a time interval during which the plurality of SM buffers store the service measurement data and do not send the service measurement data.

7. The local RNC of claim 6, wherein the depth and number of the plurality of SM buffers and the buffer serving time are allocated such that the at least one stage buffer is scalable to support a service node of increasing size by supporting a diverse number of service measurement pegging and appearing to be virtually infinite in size to applications that are pegging the service measurement data.

8. A local radio network controller (RNC) including at least one stage buffer, the at least one stage buffer comprising:
- a database configured to receive and index service measurement data; and
- a plurality of service measurement data (SM) buffers configured to store the service measurement according to the index of the database, and to send at least one of the stored service measurement data to a next stage of processing at least one of
- during the receiving of the service measurement data by the at least one stage buffer and
- before the at least one stage buffer has completed receiving the service measurement data; and wherein
- at least one of a depth and number of the plurality of SM buffers is allocated based on a buffer serving time of the service measurement data by the plurality of SM buffers such that a majority of the plurality of SM buffers are utilized while allowing for buffer overflow to occur, with buffer overflow occurring when one the depth and number of the plurality of SM buffers is exhausted and with the buffer serving time including a time interval during which the plurality of SM buffers store the service measurement data and do not send the service measurement data.

9. The local RNC of claim 8, wherein at least one of the plurality of SM buffers is configured to forwards the stored service measurement data of the at least one of the plurality of SM buffers to the next stage of processing when at least one of the depth of the at least one of the plurality of SM buffers is exhausted and the number of the plurality of SM buffers is exhausted.

10. The local RNC of claim 8, wherein the plurality of SM buffers are configured to forward service measurement data to the next stage of processing at an end of the buffer serving time.

11. The local RNC of claim 8, wherein the at least one stage buffer is configured to determines the buffer serving time based on a serving time needed to share a cost of distribution between the SM buffers, with the needed serving time based on at least one of a usage profile and a number of available SM buffers.

12. A method of collecting and distributing service measurement data using a local radio network controller (RNC) including at least one stage buffer, the method for the at least one stage buffer comprising:
- receiving and indexing service measurement data;
- storing the service measurement data according to the indexing; and
- sending at least one of the stored service measurement data to a next stage of processing at least one of during the receiving of the service measurement data by the at least one stage buffer and before the at least one stage buffer has completed receiving the service measurement data; and wherein
- the receiving receives the service measurement data including carrier measurements collected from at least one cell site in a service node, with the carrier measurements including at least one service count, where the at least one service count indicates a number of occurrences of a condition.

13. The method of claim 12, wherein the receiving indexes the at least one service count according to a key based on associated values of at least one of an IP address, cell number, sector number, bandclass, and channel number.

14. The method of claim 13, wherein the receiving implements a hash table to provide the index to at least one of the plurality of SM buffers in response to the key included in the service measurement data.

15. A method of collecting and distributing service measurement data using a local radio network controller (RNC) including at least one stage buffer, the method for the at least one stage buffer comprising:
- receiving and indexing service measurement data;
- storing the service measurement data according to the indexing; and
- sending at least one of the stored service measurement data to a next stage of processing at least one of during the receiving of the service measurement data by the at least one stage buffer and before the at least one stage buffer has completed receiving the service measurement data; and wherein
- the storing includes storing the service measurement data in a plurality of SM buffers, with at least one of a depth and number of the plurality of SM buffers allocated based on a buffer serving time of the service measurement data by the plurality of SM buffers such that a majority of the plurality of SM buffers are being utilized while allowing for buffer overflow to occur, with buffer overflow occurring when one of the depth and number of the plurality of SM buffers is exhausted.

16. The method of claim 15, wherein the storing allocates the depth and number of the plurality of SM buffers and the buffer serving time such that the at least one stage buffer is scalable to support a service node of increasing size by supporting a diverse number of service measurement pegging and appearing to be virtually infinite in size to applications that are pegging the service measurement data.

17. A method of collecting and distributing service measurement data using a local radio network controller (RNC) including at least one stage buffer, the method for the at least one stage buffer comprising:
- receiving and indexing service measurement data;
- storing the service measurement data according to the indexing; and
- sending at least one of the stored service measurement data to a next stage of processing at least one of during the receiving of the service measurement data by the at least one stage buffer and before the at least one stage buffer has completed receiving the service measurement data; and wherein
- the storing includes storing the service measurement data in a plurality of SM buffers, with at least one of a depth and number of the plurality of SM buffers allocated based on a buffer serving time of the service measurement data by the plurality of SM buffers such that at least one of the depth and number of the plurality of SM buffers is insufficient to prevent buffer overflow, with buffer overflow occurring when one the depth and number of the plurality of SM buffers is exhausted and with the buffer serving time including a time interval during which the plurality of SM buffers store the service measurement data and do not send the service measurement data.

18. The method of claim 17, wherein the sending forwards the stored service measurement data of at least one of the plurality of SM buffers to the next stage of processing when at least one of the depth of the at least one of the plurality of SM buffers is exhausted and the number of the plurality SM buffers is exhausted.

19. The method of claim 17, wherein the sending forwards the service measurement data of the plurality of SM buffers to the next stage of processing at an end of the buffer serving time.

20. The method of claim 17, wherein the sending determines the buffer serving time based on a serving time needed to share a cost of distribution between the plurality of SM buffers, with the needed serving time based on at least one of a usage profile and a number of available SM buffers.

* * * * *